(12) United States Patent
Sun

(10) Patent No.: US 9,985,434 B2
(45) Date of Patent: May 29, 2018

(54) MULTI-TERMINAL DC POWER SYSTEMS EMPLOYING AUTONOMOUS LOCAL CONTROL METHODS

(71) Applicant: Rensselaer Polytechnic Institute, Troy, NY (US)

(72) Inventor: Jian Sun, Clifton Park, NY (US)

(73) Assignee: RENSSELAER POLYTECHNIC INSTITUTE, Troy, NY (US)

( * ) Notice: Subject to any disclaimer, the term of this patent is extended or adjusted under 35 U.S.C. 154(b) by 294 days.

(21) Appl. No.: 14/770,970

(22) PCT Filed: Feb. 25, 2014

(86) PCT No.: PCT/US2014/018256
§ 371 (c)(1),
(2) Date: Aug. 27, 2015

(87) PCT Pub. No.: WO2014/134017
PCT Pub. Date: Sep. 4, 2014

(65) Prior Publication Data
US 2016/0013641 A1 Jan. 14, 2016

Related U.S. Application Data

(60) Provisional application No. 61/769,792, filed on Feb. 27, 2013.

(51) Int. Cl.
*H02J 1/10* (2006.01)
*H02J 1/00* (2006.01)
(Continued)

(52) U.S. Cl.
CPC .................... *H02J 1/00* (2013.01);
*H02J 3/18* (2013.01); *H02J 3/36* (2013.01);
*H02J 3/382* (2013.01);
(Continued)

(58) Field of Classification Search
None
See application file for complete search history.

(56) References Cited

U.S. PATENT DOCUMENTS

2010/0091527 A1* 4/2010 Asplund ................ H02J 3/36
363/35
2012/0092904 A1 4/2012 Nuqui et al.
(Continued)

OTHER PUBLICATIONS

International Search Report for International Application PCT/US2014/018256, dated Feb. 24, 2015.
(Continued)

*Primary Examiner* — Cassandra Cox
(74) *Attorney, Agent, or Firm* — Heslin Rothenberg Farley & Mesiti P.C.

(57) ABSTRACT

A multi-terminal DC power system includes: a DC network connecting together multiple terminals. Each terminal is represented by one of: a voltage source converter having a capacitor at an interface to the DC network, wherein a difference between a converter-side current and a network-side current charges the capacitor, and a current source converter having an inductor at an interface to the DC network, wherein a difference between a converter-side voltage and a network-side voltage drives current through the inductor. A local controller for each terminal directly controls the converter-side current of each voltage source controller and the converter-side voltage of each current source converter, independent of the terminals, leaving network-side currents and voltages to be determined by the network, resulting in simplified terminal control and avoidance of the need for high-speed communication among all terminals at all times.

21 Claims, 6 Drawing Sheets

(51) Int. Cl.
*H02J 3/18* (2006.01)
*H02J 3/36* (2006.01)
*H02J 3/38* (2006.01)

(52) U.S. Cl.
CPC .............. *H02J 3/386* (2013.01); *Y02E 40/30* (2013.01); *Y02E 60/60* (2013.01)

(56) References Cited

U.S. PATENT DOCUMENTS

2013/0258724 A1* 10/2013 Shen .................. H02J 3/36
363/35
2015/0171741 A1* 6/2015 Sastry ................ H02M 1/4233
363/40

OTHER PUBLICATIONS

Xia Chen et al. "Integrating Wind Farm to the Grid Using Hybrid Multiterminal HVDC Technology" IEEE Transactions on Industry Applications, IEEE Service Center, Piscataway, NJ, US, vol. 47, No. 2, Mar. 1, 2011, pp. 965-972.
Hongbo Jiang et al. "Multiterminal HVDC Systems in Urban Areas of Large Cities" IEEE Transactions on Power Delivery, IEEE Service Center, New York, NY, US, vol. 13, No. 4, Oct. 1, 2998, pp. 1278-1284.
Luke Livermore et al. "MTDC-VSC Technology and its applications for wind power" Universities Power Engineering Conference (UPEC), 2010 45th International, IEEE, Piscataway, NJ, US, Aug. 31, 2010, pp. 1-6.
Abbas A.M. et al. "PWM Based VSC-HVDC Systems—A Review" Power & Energy Society General Meeting, 2009, PES '09, IEEE, IEEE, Piscataway, NJ, US, Jul. 26, 2009, pp. 1-9.

\* cited by examiner

MULTI-TERMINAL DC POWER SYSTEMS EMPLOYING AUTONOMOUS LOCAL CONTROL METHODS

CROSS-REFERENCE TO RELATED APPLICATION

This application is a national stage filing under section 371 of International Application No. PCT/US2014/018256, filed on Feb. 25, 2014, and published in English on Sept. 4, 2014, as WO 2014/134017 and claims priority of U.S. Provisional Application No. 61/769,792 filed on Feb. 27, 2013, the entire contents of which are hereby incorporated by reference herein.

BACKGROUND ART

The present invention relates generally to multi-terminal DC power systems and, more particularly, to control schemes for such systems.

DC transmission is an attractive alternative to conventional ac transmission for offshore wind farms, solar farms located in remote areas, bulk and/or long-distance power transmission, and other applications. The control methods of the present invention are especially well suited (but not limited to) such DC transmission applications.

FIG. 1 shows a multi-terminal DC power system where multiple sources and loads (denoted as $\mathcal{T}_1, \mathcal{T}_2, \ldots, \mathcal{T}_s$) are connected together by a network (denoted as $\mathcal{N}$). Each source or load is referred to as a terminal in this description. A source terminal receives power from a source (not shown) such as a wind turbine, a wind farm, an AC power system, or another DC power system, and feeds the received power into the DC network. A load terminal receives power from the DC network and feeds it to loads (not shown) in either DC or AC form. A source terminal will also be referred to as a sending terminal because it sends power to the DC network, and the two terms will be used interchangeably in this description. Similarly, a load terminal will also be referred to as a receiving terminal because it receives power from the DC network, and the two terms will also be used interchangeably in this description. The connections among the different terminals within the network $\mathcal{N}$ can be series, parallel, or a mix of the two (meshed).

In one embodiment of a multi-terminal DC power system, each source (sending) terminal receives power from a wind turbine power generator in an offshore wind farm, and multiple source terminals are connected in series in the DC network $\mathcal{N}$. The series-connected source terminals can be connected in parallel with other series-connected source terminals. Alternatively, multiple source terminals cm be connected in parallel first, and then in series with other parallel-connected source terminals. The power collected from the source terminals is fed through DC cables into onshore load (receiving) terminal which connects to an onshore (AC or DC) power network. Such a multi-terminal DC power system configuration be applied to integrate offshore wind farms with an onshore power grid, and it has the benefit that a medium or high voltage DC link can be established with the onshore power grid through series connection of low-voltage sending terminals, such that no additional power converter and associated offshore platform are required to boost the voltage.

In another embodiment of a multi-terminal DC power system, each sending or receiving terminal connects the DC network $\mathcal{N}$ to an AC power grid. The AC power grids connected by different terminals can also be interconnected by an AC network. The direction of power flow through each terminal may also reverse, so that a terminal can work as a sending terminal at one time and a receiving terminal at another time. One application of such a multi-terminal DC power system is in power distribution for large metropolitan areas that receive power from multiple AC in-feeds.

At the interface to the DC network, each terminal may behave like and be represented by a current-source converter (CSC) or a voltage-source converter (VSC). A CSC has an inductor in series at the interface to the DC network and appears as a current source to the DC network, white a VSC has a capacitor in parallel at the interface to the DC network and appears as a voltage source to the DC network. Note that the term current-source or voltage-source converter refers to the characteristics of the converter and does not imply that the terminal formed by the converter works as a source (sending) terminal in the DC network. A CSC or VSC in this invention is assumed to be able to support bidirectional power flow and can be operated as either a sending (source) or receiving (load) terminal. Moreover, this clarification is independent of the form of power that is interfaced with the DC network by such a converter—it can be poly-phase AC, single-phase AC, variable-frequency AC, DC, hybrid AC-DC, or any other form. Examples of a CSC and a VSC for interfacing three-phase AC with the DC network $\mathcal{N}$ include a line-commutated converter (LCC), and a pulse-width modulated (PWM) voltage-source converter (VSC), respectively.

Line-commutated converter (LCC) is a mature technology and is a common type of CSC for high-voltage DC (HVDC) applications. FIG. 2$a$ depicts a 12-pulse LCC acting as an interface between three-phase AC and DC. The series inductor (L) at the interface to the DC network makes the converter behave like a current source to the DC network. It is the nature of LCC that the direction of DC interface current ($i_0$) cannot change, but the polarity of the DC interface voltage ($v_0$) can be reversed by changing the firing angle to reverse the direction of power flow.

FIG. 2$b$ depicts a two-level PWM VSC. The parallel capacitor (C) at the interface to the DC network makes the converter behave like a voltage source to the DC network. It is the nature of a PWM VSC that the polarity of the DC interface voltage ($v_0$) cannot be reversed, but the direction of current ($i_0$) flow can be changed to change the direction of power flow.

There are many variations to the two-level PWM VSC depicted to FIG. 2$b$, including multilevel converters and modular multilevel converters (MMC). These converters am similar to the two-level VSC as far as their voltage-source characteristics at the interface to the DC network are concerned. Compared to LCC, PWM control has faster responses and cans operate with a unity, leading or lagging power factor at the AC interface. PWM control cars also be used in CSC to achieve similar improvements over conventional LCC CSC. The present invention is directed to the control of CSC and VSC for use in multi-terminal DC power systems regardless of their specific circuit constructions or device-level control (PWM or line-commutated.) The reference to specific converter types (such as LCC) for particular applications (such as HVDC transmission) in the following description is for the purpose of illustration only and does not limit the present invention to those specific types of converters or applications.

In conventional LCC-based HVDC systems, the current $i_0$ at the DC interface of each terminal is the primary subject of control. The voltage ($v_0$) the DC interface may also be controlled indirectly by considering it to be approximately equal to the voltage behind the inductor, that is, by ignoring the voltage across the inductor.

In a point-to-point HVDC system connecting two AC networks, for example, a simple control scheme is for the sending-terminal converter (rectifier) to control its output current while the receiving-terminal converter (inverter) maintains a constant voltage at some point of the DC link. The reference voltage and current of each terminal may also be made dependent of each other in order to implement such terminal characteristics as constant power or voltage or current droops.

Similar methods have been applied to VSC-based HVDC systems. In most cases, a VSC is simply used as replacement for a LCC and is controlled to provide similar characteristics at the DC interface.

The voltage and current at the DC interface of each terminal as defined in FIG. 1 depend on the converter as much as on the rest of the system. For example, the output current ($i_O$) of the LCC in FIG. 2a is driven by the difference between the thyristor bridge voltage and the network voltage ($v_O$) across the DC connection to the network. Similarly, the capacitor of the VSC in FIG. 2b is charged by the current flowing out of the converter switching circuit minus the network current ($i_O$).

Therefore, the voltage and current at each terminal is strongly coupled to other terminals, such that their control must account for the dynamics of the entire DC network, which requires either central control or close coordination among different terminal controls. Fast communication is required in either case and control complexity increases exponentially with the number of terminals.

The requirement for communication bandwidth and the sensitivity to communication delays or fault also increases with the speed of control at each terminal, such that it is more difficult to implement such control for PWM-based systems.

BRIEF SUMMARY OF THE INVENTION

The present invention facilitates formation and operation of multi-terminal DC systems without central control or fast communication by applying autonomous local control methods to both sending and receiving terminals of the multi-terminal DC system. The present invention contemplates various methods or modes to locally control individual terminals independently from other terminals. Network wide supervisory system coordination can be employed requiring only occasional or intermittent exchange of low-bandwidth signals to avoid possible conflict in steady-state operation and to enhance transient stability.

The combination of autonomous local control and simple supervisory system coordination greatly simplifies system design and improves system reliability, as well as tolerance to interrupts and faults in communication. Control schemes of the present invention can be applied advantageously to multi-terminal HVDC transmission systems, as well as other DC power-systems incorporating multiple sources and loads.

Additionally, methods to control the receiving terminals to reduce voltage variation of series-connected constant-power sending terminals are provided.

According to a first aspect, of the present invention, a multi-terminal DC power system includes a DC network connecting together multiple terminals. Each terminal is represented by one of: (a) a voltage source converter having a capacitor in parallel at the interface to the DC network, and (b) a current source converter having an inductor in series at the interface to the DC network. A difference between a converter-side current and a network-side current charges the capacitor of the voltage source converter. A difference between a converter-side voltage and a network-side voltage drives current through the inductor of the current source converter.

A local controller for each terminal directly controls the converter-side current of each voltage source convener and the converter-side voltage of each current source converter, leaving the network-side current of each voltage source converter and the network-side voltage of each current source converter to be determined by the DC network. In this fashion, terminal control is simplified and the need for high-speed communication among all terminals at all times is avoided.

Regardless of network topology, the local controller preferably controls converter-side current of a voltage source converter in at least one of the following modes: constant power in winch the converter-side current is controlled such that the product between the converter-side current and the terminal voltage follows a givers power reference; constant current in which the converter-side current is controlled to follow a current reference which is independent of terminal voltage; current droop in which the converter-side current is controlled to follow variation in the terminal voltage by a droop characteristic; and constant voltage in which the converter-side current is controlled to keep the terminal voltage constant. The terminal voltage of a voltage source converter is the voltage across the capacitor at the interface to the DC network.

Regardless of network topology, the local controller preferably controls the converter-side voltage of a current source converter in one of the following modes: constant power in which the product of the converter-side voltage with the terminal current follows a given power reference; constant voltage in which the converter-side voltage is controlled to follow a voltage reference which is independent of the terminal current; voltage droop in which the converter-side voltage is controlled to follow the terminal current by a droop characteristic; and constant current in which the converter-side voltage is controlled to keep the terminal current constant. The terminal current of a current source converter is the current flowing through of the inductor at the interface to the DC network.

Each terminal regardless of whether it is formed by a current source converter or a voltage source converter, may act as a source (sending) or load (receiving) terminal. The power, voltage, or current reference used in each control mode discussed above is provided in accordance with the intended direction of power flow. The direction of power flow may also reverse during the course of operation, such that a terminal operating as a sending terminal may become a receiving terminal at a different time, and vise verse. Such power reversal is possible at any terminal as long as the converter used at that terminal is designed to support bidirectional power flow.

The network of the multi-terminal DC power system may include series or parallel or a mix of series and parallel connections. Each terminal may be formed by a current source converter or a voltage source converter, and may act as either a sending terminal or a receiving terminal at a given time. The system may comprise a hybrid system including at least one voltage source converter terminal and at least one current source converter terminal.

The multi-terminal PC power system of the present invention may farther include a supervisory system coordinator coordinating the references used in different local controllers to avoid possible system conflict. The reference may comprise at least one of: a power reference used in a constant power control mode, a voltage reference used in a constant voltage control mode, a current reference used in a constant current control mode and a droop coefficient used in voltage or current droop control mode.

The supervisory system coordinator may facilitate intermittent exchange of low-bandwidth signals to avoid possible system conflict in steady-state operation and to enhance transient stability.

In another aspect, the multi-terminal DC power system of the present invention may have a parallel string architecture wherein multiple source terminals are connected in series (forming a string) in the DC network $\mathcal{N}$. The series-connected source terminals may be connected in parallel with other series-connected source terminals. Alternatively, the multi-terminal DC power system of the present invention may have a series row architecture wherein multiple source terminals may be connected in parallel first (forming a row), and then in series with other parallel-connected source terminals to form a string. Each sending terminal of the system may be controlled as a constant power source, each string may be connected to a DC bus, and a receiving terminal may be controlled by one or a combination of the following modes to minimize voltage unbalance among the sending terminals: constant current, constant voltage, and voltage or current droop.

The current invention further contemplates a method of operating a multi-terminal DC power system including a DC network connecting together multiple terminals. Each terminal may be represented by one of: (a) a voltage source converter having a capacitor at the interface to the DC network, wherein the difference between the converter-side current and the network-side current charges the capacitor, and (b) a current source converter having an inductor at the interface to the DC network, wherein the difference between the converter-side voltage and the network-side voltage drives current through the inductor.

Steps of the method may include: directly controlling locally the converter-side current of each voltage source converter and the converter-side voltage of each current source converter at each terminal; and determining network-side currents of voltage source converter terminals and voltages of current source convener terminals for the terminals by the network.

In the method, regardless of network topology, the converter-side current of a voltage source converter may be controlled in at least one of the following modes: constant power in which the product between the converter-side current and the terminal voltage is controlled to follow a given power reference; constant current in which the converter-side current is controlled to follow a current reference which is independent of terminal voltage; current droop in which the converter-side current is controlled to follow variation in the terminal voltage by a droop characteristic; and constant voltage in which the converter-side current is controlled to keep the terminal voltage constant. The terminal voltage of a voltage source converter is the voltage across the capacitor at the interface to the DC network.

In the method, regardless of network topology, the converter-side voltage of a current source converter may be controlled in one of the following modes: constant power in which the product between the converter-side voltage and the terminal current is controlled to follow a given power reference; constant voltage in which the converter-side voltage is controlled to follow a voltage reference which is independent of terminal current; voltage droop in which the converter-side voltage is controlled to follow the terminal current by a droop characteristic; and constant current in which the converter-side voltage is controlled to keep the terminal current constant. The terminal current of a current source converter is the current flowing through of the inductor at the interface to the DC network.

The method may, advantageously, further comprise employing a supervisory system coordinator for intermittent exchange of low-bandwidth signals to avoid possible system conflict in steady-state operation and to enhance transient stability.

The method may, advantageously, be employed in high-voltage DC transmission applications such as grid integration of renewably energy sources, for example, an offshore wind farm.

The method may further include applying capacitor voltage or inductor current feedforward or non-linear current/voltage control to enhance local control performance. The rate of change in the power, voltage, or current reference may be limited to avoid transient over-voltage and large current variation during transients.

In a further aspect of the invention, wherein the multi-terminal DC power system may have a parallel string architecture with a number of sending terminals connected in series to form a string and a number of strings operating in parallel and feeding power to a common DC bus, the method may further comprise: controlling each sending terminal in a constant power mode, and controlling the receiving terminal of the network in a constant current mode, with a current reference at or close to the rated current of the receiving terminal, and switching to a current droop control mode when the terminal voltage of the receiving terminal drops below a certain level.

BRIEF DESCRIPTION OF THE DRAWING FIGURES

Features, benefits and other aspects of the present invention will be readily understood from the following detailed description of various embodiments, taken in conjunction with the accompanying drawings, in which:

FIG. 1 schematically depicts a DC power system including multiple terminals connected to a DC network;

Figure 4:
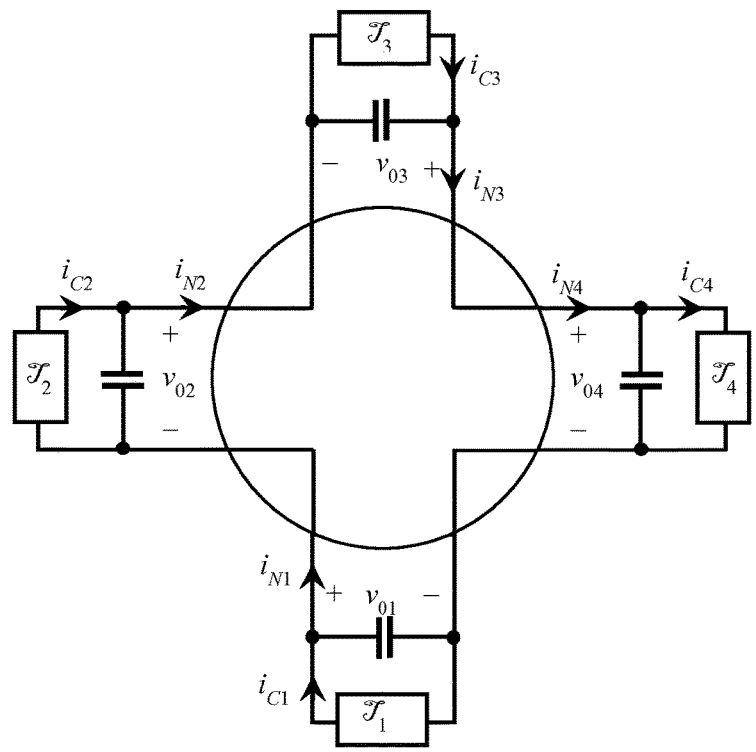
FIG. 4 is an example of a four-terminal. VSC-based system operating according to the present invention.
Figure 5:
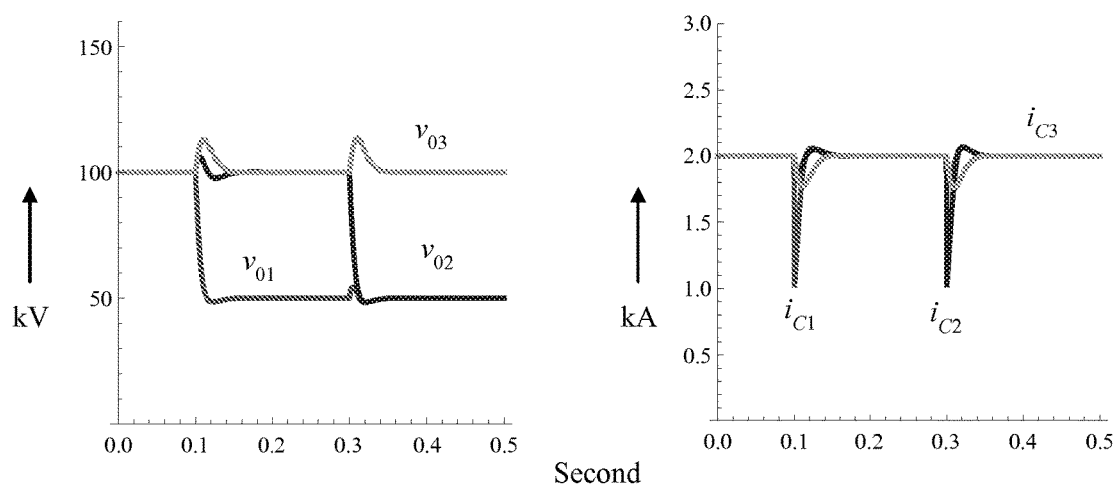
Figure 6:
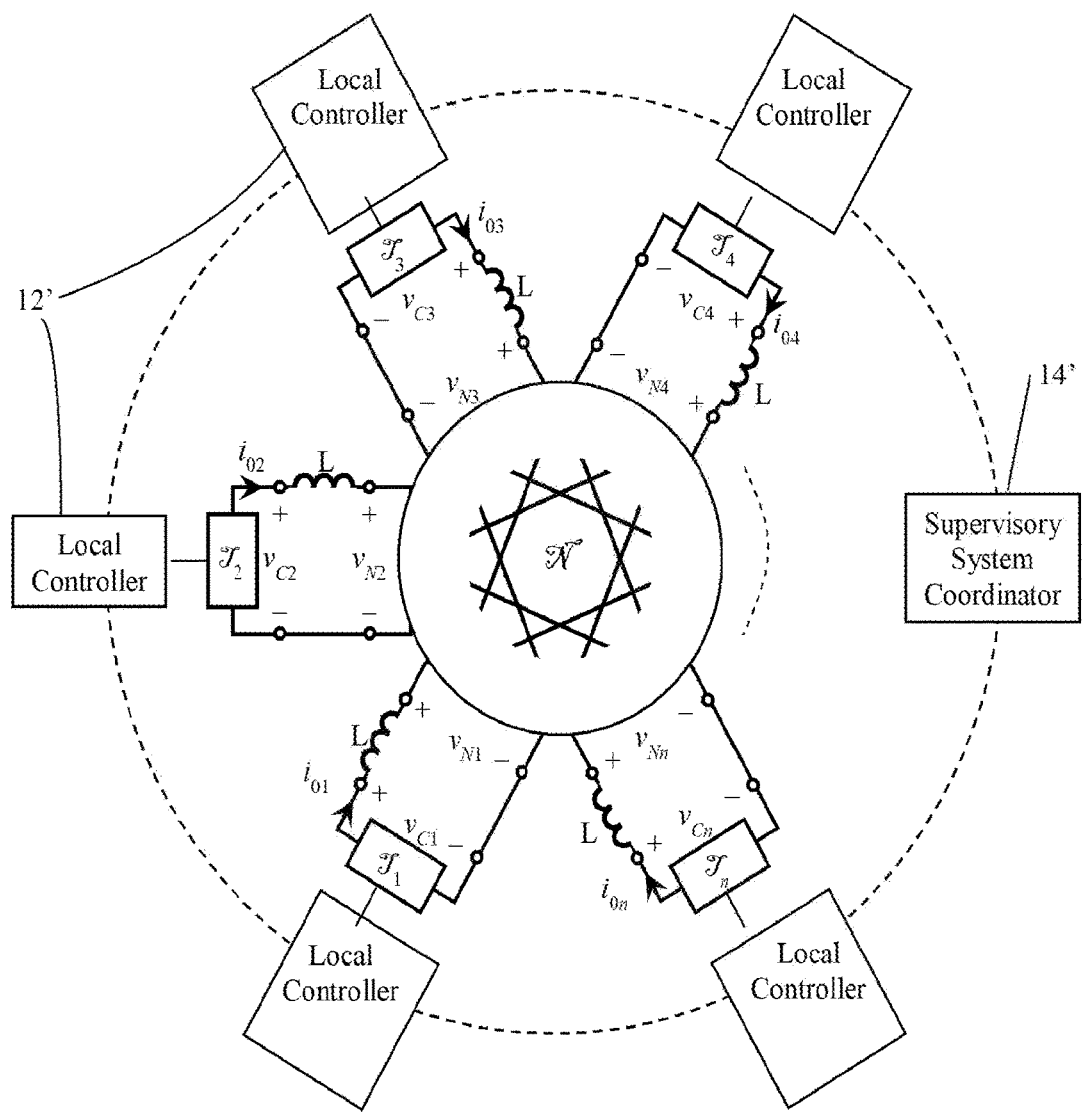
Figure 7:
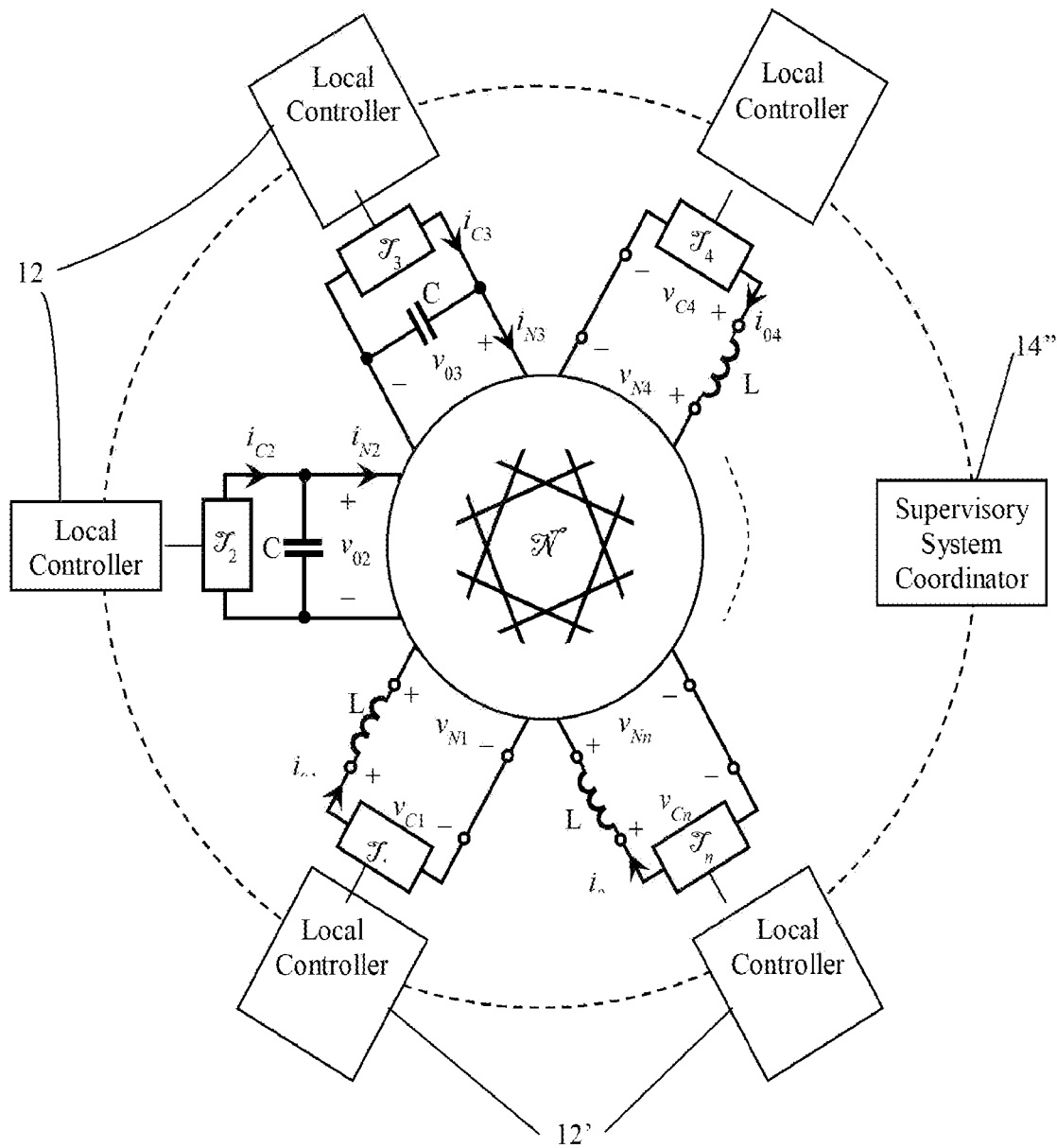
Figure 8A:
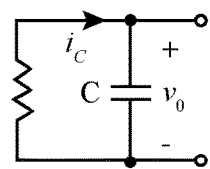
Figure 8B:
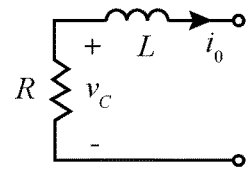
Figure 9A:
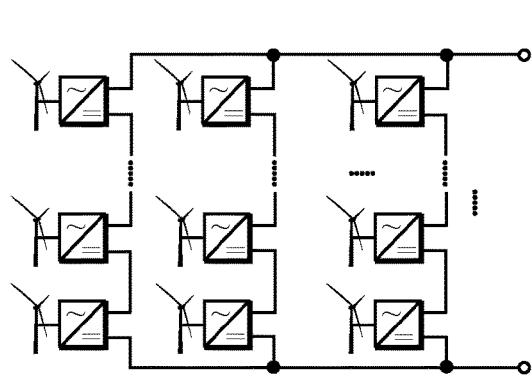
Figure 9B:
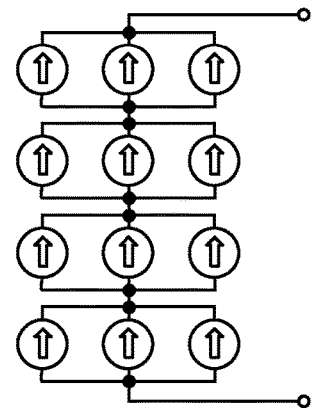
Figure 10:
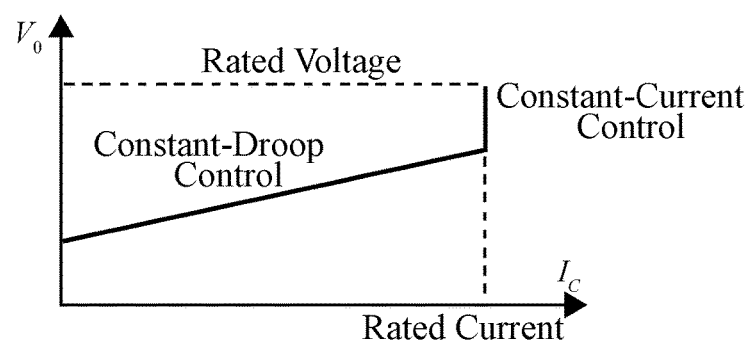

FIG. 5 presents graphs of simulated responses of the four-terminal VSC-based system of FIG. 4;

FIG. 6 depicts a CSC-based multi-terminal DC system with the inductor at the interface to the DC network taken out of each terminal and shown as a system component;

FIG. 7 depicts a hybrid system having both VSC and CSC terminals, operating in accordance with the principles of the present invention;

FIG. 8a depicts a small-signal equivalent circuit of a VSC terminal under ideal control;

FIG. 8b depicts a small-signal equivalent circuit of a CSC terminal under ideal control;

FIG. 9a depicts a multi-terminal DC power system employing a parallel string architecture:

FIG. 9b depicts a multi-terminal DC power system employing a series row architecture; and FIG. 10 illustrates receiving-terminal control combining constant-current and current droop control.

DETAILED DESCRIPTION

According to the present invention, local direct control of converter-side voltages and currents provides a new advantageous way to operate multi-terminal DC power systems. Such control requires only local variables that are directly measurable at each terminal. This allows each terminal control to be designed and implemented independently from other terminals. In this manner, different terminals can operate antonomously while system stability is ensured by the selection of appropriate control modes.

Supervisory control coordination requiring only occasional or intermittent exchange of low-bandwidth signals may be incorporated at the system level to avoid possible conflict in steady-state operation and to enhance transient stability. The combination of autonomous local control find simple supervisory system coordination greatly simplifies system design and improves system reliability, as well as tolerance to interrupts and faults in communication. The approaches of the present invention may be applied to multi-terminal HVDC transmission systems, as well as other DC power systems incorporating multiple sources and loads.

Figure 3:
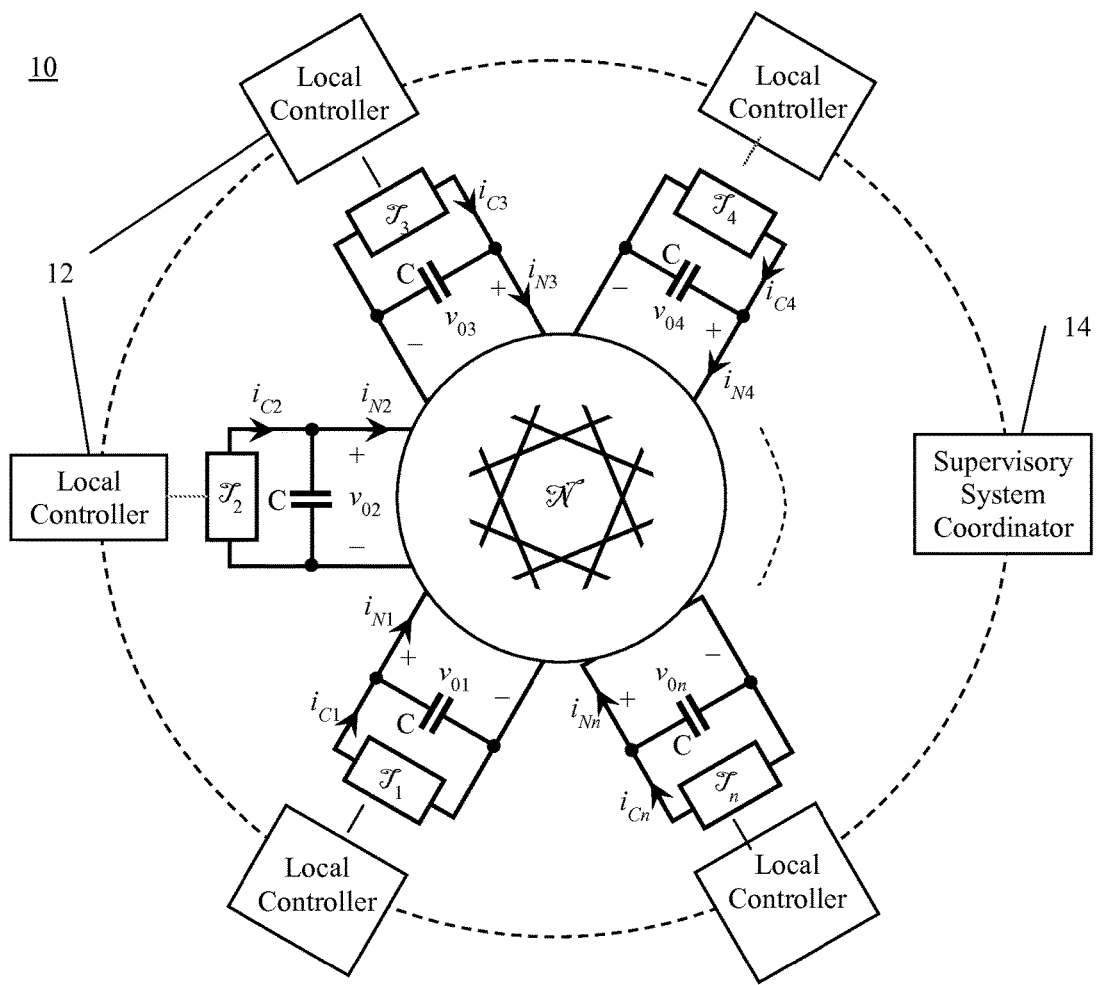
FIG. 3 depicts a VSC-based multi-terminal DC system with the capacitor at the interface to the DC network taken out of each terminal and shown as a system component.

The basis for the new control methods of the present invention is a different partitioning of multi-terminal DC systems, as illustrated in FIG. 3 for VSC-based systems (10), in FIG. 6 for CSC-based systems (10'), and in FIG. 7 for hybrid systems (10") using both VSC and CSC terminals.

Figure 1:
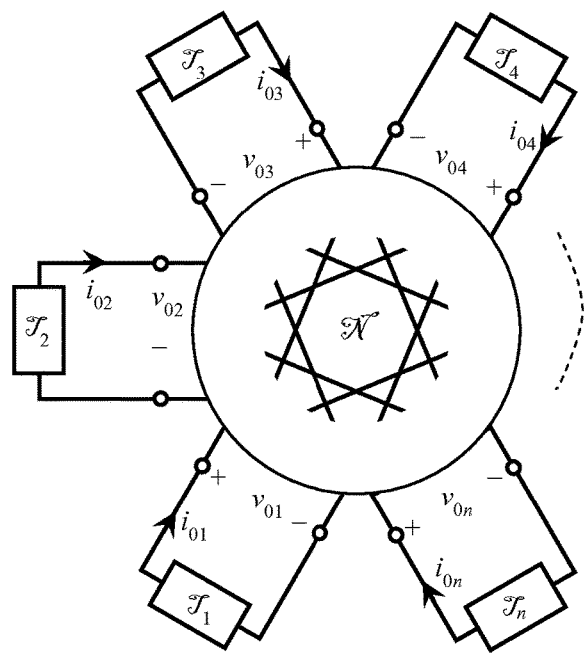

Compared to FIG. 1, the main feature of the new partitioning is that the parallel capacitor (C) at the interface to the DC network ($\mathcal{N}$) of each VSC and the series inductor (L) at the interface to the DC network of each CSC is taken out of the converter block and explicitly shown at the system level. Additional control variables are also identified: the current ($i_C$) that charges tire capacitor of at the DC interface of each VSC and the voltage ($v_C$) that drives the current through the inductor at the DC interface of each CSC. The currents on the two sides of the parallel capacitor of a VSC-based terminal are referred to as the converter-side current ($i_C$) and the network-side current ($i_N$), respectively. Similarly, the voltages on the two sides of the series inductor of a CSC-based terminal are referred to as the converter-side voltage ($v_C$) and the network-side voltage ($v_N$), respectively. The difference between the converter-side and the network-side currents charges the parallel capacitor of a VSC. Likewise, the difference between the converter-side and the network-side voltages drives the current through the series inductor of a CSC.

A VSC may use more than one capacitor at its interface to the DC network and these capacitors maybe connected in series, parallel or other manners. These capacitors can be functionally replaced by a single capacitor, and the capacitor C in FIGS. 3 and 7 for each VSC terminal represents the equivalent capacitor of all these capacitors. Similarly, a CSC may use more than one inductor at its interface to the DC network and these inductors may be connected in series, parallel, or other manners. These inductors can be functionally replaced by a single inductor, and the inductor L in FIGS. 6 and 7 for each CSC terminal represents the equivalent inductor of all these inductors.

Existing HVDC system control methods attempt to control the network-side current and voltage of each terminal directly. The mutual coupling among these network-side variables complicates the control design and necessitates the use of high-speed communications among all terminals at all time. In contrast, the local control methods of the present invention control the converter-side currents and voltages, leaving the networks-side currents and voltages to be determined by the network. This avoids the need for high-speed communication and greatly simplifies the design, analysis and implementation of each terminal control.

Regardless of the network topology, the converter-side current $i_C$ of any VSC terminal in FIG. 3 may be controlled by a local controller (12) at the respective VSC terminal by one of the following methods or modes:

A1. Constant Power: $i_C$ is controlled such that the product between $i_C$ and the terminal voltage $v_0$ follows a given power reference. For terminal k, this means that $v_{0k}i_{Ck}=p_k$, where $p_k$ is the given power reference.

A2. Constant Current: $i_C$ is controlled to follow a current reference which is independent of the terminal voltage.

A3. Current Droop: $i_C$ controlled to follow the variation in the terminal voltage by a droop characteristic: $i_{Ck}=l_{Ck}-g_{dk}v_{0k}$.

A4. Constant Voltage: $i_C$ is controlled to keep the terminal voltage $v_{0k}$ constant. This can be achieved, for example, by making $i_{Ck}$ to follow the network-side current $i_{Nk}$.

Figures 2A, 2B:
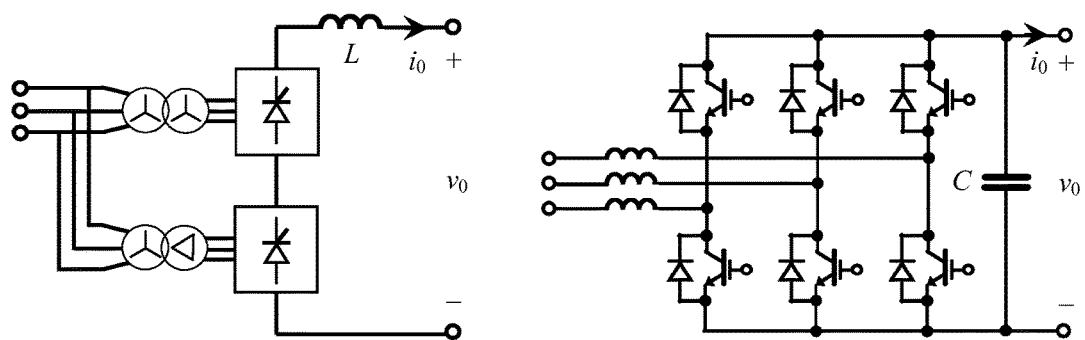
FIG. 2a depicts a 12-pulse LCC terminal formed by two 6-pulse converters in series.
FIG. 2b depicts a 2-level voltage source converter.

These methods are similar to the existing methods that control the network-side currents. However, their design and effects on the system behavior are very different Consider the k* terminal in the VSC-based system depicted in FIG. 3 and refer to FIG. 2b for details of an exemplary VSC circuit. The converter-side current $i_{Ck}$ is related to the ac phase currents by the following equation where $\{d_{ak}, d_{bk}, d_{ck}\}$ are the duty ratios of the upper-side switches of the VSC in FIG. 2b and $\{i_{ak}, i_{bk}, i_{ck}\}$ are the three ac phase currents: $i_{Ck}=d_{ak}i_{ak}+d_{bk}i_{bk}+d_{ck}i_{ck}$.

Responses of the ac phase currents arc affected by the terminal voltage $v_{0k}$ the switch duty ratios, but are independent of any other parameters of the DC network. Standard converter-level control methods can be applied by a local controller 12 at each VSC terminal to regulate the phase currents and the converter-side DC current to fulfill any of the control objectives A1-A4. Therefore, the converter-side current control can be designed and implemented independent of the design and operation of other terminals.

It is understandable that local control at each terminal affects system operation. To balance the power among all sending and receiving terminals, for example, the power references used in the constant-power control mode should be coordinated. Similarly, the current and voltage references for different terminals may also need to be coordinated to avoid system conflict. Such coordination can be performed by a supervisory system controller or coordinator (14) that modifies the power, voltage or current reference for each terminal. Since such system control doesn't need to interfere with the cycle-by-cycle operation of individual terminals and changes in the references are usually slow, communications between the supervisory controller and individual terminal controls can be slow and would be much more tolerant to possible interrupts or faults than when the network-side currents are controlled directly.

As an illustration, consider the four-terminal system depicted in FIG. 4, where terminals #1-#3 are in series and send power to terminal #4. All three sending terminals are controlled by method A1, that is, as constant-power sources, while terminal #4 is controlled by method A2 as a constant-current load. Note that the reference directions for the 4$^{th}$ terminal are redefined such that the current and voltage are positive when the terminal receives power. Assume all terminals have the same terminal capacitance of 100 μF. FIG. 5 shows the simulated responses of the terminal voltages and (converter-side) currents of the four terminals under the following conditions:
1) Ideal constant-power control at all sending terminals, that is, the converter-side current of each terminal is controlled to instantly follow the reference: $i_{Ck}=p_k/v_{0k}$, k=1, 2, 3. Initially, each sending terminal (#1-#3) delivers 200 MW of power and terminal #4 is controlled to receive 600 MW power. The receiving terminal voltage is set at 300 kV, which is equally divided among the three sending terminals in steady state.
2) At t=0.1 s, terminal #1 power is increased by 100 MW to 300 MW.
3) At t=0.3 s, terminal #2 power is decreased from 200 MW to 100 MW.
4) Terminal #4 converter-side current is maintained at the rated 2000 A level throughout the operation.

The simulated responses in FIG. 5 show that, each time when a change in the power output of any terminal occurs, the voltage of each terminal automatically adjusts itself and settles to a new level smoothly. All terminal currents remain constant at 2 kA except for a brief transient following each power change.

The simulation in FIG. 5 assumed step changes in the terminal output power. The transient over-voltage and large current variation during transient can be avoided by limiting the power rate of change.

Similar to the converter-side current control methods for VSC terminals described above, the converter-side voltage $v_C$ a CSC terminal in FIG. 6 can be controlled by a local controller (12') at the respective CSC terminal by one of the following methods or modes:

B1. Constant Power: $v_C$ is controlled such that the product between the converter-side voltage and the terminal current follows a given power reference. For terminal k, this means $v_{Ck}i_{0k}=p_k$, where $p_k$ is the given power reference.

B2. Constant Voltage: $v_C$ is controlled to follow a voltage reference which is independent of the terminal current.

B3. Voltage Droop: $v_C$ is controlled to follow the terminal current by a droop characteristic: $v_{Ck}=V_{Ck}-R_{dk}i_{0k}$.

B4. Constant Current: $v_C$ is controlled to keep the terminal current $i_{0k}$ constant. This can be achieved, for example, by making voltage $v_{Ck}$ to follow the network-side voltage $v_{Nk}$.

Like for VSC terminals, each of these modes can be implemented through local control of the CSC by a local controller (12'), and each can be designed and implemented independent of other terminals. Some system-level supervisory control by a supervisory system controller or coordinator (14') may also be required to coordinate the references for different terminals. Such system-level control is again intermittent, slow and insensitive to delays and faults in communication because of the slow variation of signals which need to be exchanged.

FIG. 7 shows a hybrid multi-terminal DC system (10") that uses both VSC and CSC terminals. Each VSC terminal can be controlled by any of the methods A1-A4, while each CSC terminal can be controlled by any of the methods B1-B4, by respective local controllers (12"). Not all combinations would work in practice, and certain system-level supervisory control by a supervisory system controller or coordinator (14") may be required to coordinate the voltage and current references such that system power is balanced in steady state.

Control of each VSC terminal in the VSC-based multi-terminal DC system illustrated in FIG. 3 or the hybrid multi-terminal DC system of FIG. 7 can also change among, or use a combination of, the four methods A1-A4 depending on the respective terminal operation conditions or system-level supervisory control commands. For example, a sending terminal controlled by the constant-power method may change to constant-voltage control when the terminal voltage starts to exceed a certain value. Similarly, control of each CSC terminal in the CSC-based multi-terminal DC system illustrated in FIG. 5 or the hybrid multi-terminal DC system of FIG. 7 can also change among, or use a combination of, the four methods B1-B4 depending on the respective terminal operation conditions or system-level supervisory control commands.

A local controller is part of the terminal and may be implemented using various known methods, such as analog and/or digital control. Signals such as the voltage and current at the DC or AC interface of the terminal that are used by the local controller may he obtained by various sensing devices and provided to the local controller through direct electrical connection. A supervisory system coordinator receives signals such as voltage, current and power that represent the operation of each terminal in the DC network, determines the desired voltage, current or power reference for each terminal based on system operation requirements, and sends the determined references back to each terminal. Signal exchange between the supervisory system coordinator and the terminals can be through electrical wires or by wireless communication. The supervisory system coordinator may be co-located with one of the terminals or at a separate location.

Each of the control methods previously discussed acts on individual terminals and can be designed to ensure stability under given network conditions. Since the terminals act independently of each other, it is important to assess their effects on overall system stability.

Stability of a given multi-terminal DC system can be analyzed based on a system model that includes: 1) the network, including its impedance and any protection or additional control devices; 2) the capacitors of VSC-based terminals and inductors of the CSC-based terminals; and 3) dynamics of individual terminals including the converter circuits and control functions.

Compared to existing HVDC system control methods, the use of local controls greatly simplifies the system modeling effort. Once a complete system model has been developed, system stability can be analyzed by different methods. Since the models are in general nonlinear, small-signal analysis and numerical simulation would be necessary in many cases. However, under certain assumptions, the system model can be greatly simplified to make it possible to develop some general insights and guidelines in the selection of different control methods. One assumption that is justifiable for system analysis is that the local controls are ideal. This implies that each of the local control variables (converter-side current of VSC and converter-side voltage of CSC) follow its reference perfectly. Under this assumption, each terminal (excluding the capacitor C for a VSC and inductor L for a CSC) can be replaced by a resistor as defined in Table 1 and illustrated in FIGS. 8a and 8b, where $V_0$, $I_C$, $V_C$, and $I_0$ represents the steady-state values of the corresponding lower-case variables. Note that the actual current or voltage for a receiving terminal is negative in the given reference directions, such that the equivalent small-signal resistance is negative for a terminal receiving constant power.

TABLE I

Small-Signal Equivalent Circuit under Different (Idealized) Controls

| VSC-Based Terminals | | CSC-Based Terminals | |
|---|---|---|---|
| Constant Power | R = $V_o/I_c$ | Constant Power | R = $V_c/I_o$ |
| Constant Current | R = ∞ | Constant Voltage | R = 0 |
| Current Droop | R = $1/g_d$ | Voltage Droop | R = $R_d$ |
| Constant Voltage | R = 0 | Constant Current | R = ∞ |

With such a small-signal model established for each terminal, it becomes possible to develop general stability conditions for a given mold-terminal DC power system configuration. For example, the model of a system without constant-power receiving terminals is represented by a RLC network without negative resistor because, according to Table 1, only constant-power receiving terminals exhibit negative-resistor behavior. The system is therefore always stable (in small-signal sense and under the stated ideal control assumption).

The equivalent circuit model given in FIGS. 8a and 8b can be generalized to account for actual control dynamics at each terminal by replacing the resistor by a complex impedance element defined as follows, where Δ indicates small-signal variation:

1) VSC Terminal $$Z(s) = -\frac{\Delta V_0(s)}{\Delta I_C(s)}$$

2) CSC Terminal $$Z(s) = -\frac{\Delta V_C(s)}{\Delta I_0(s)}$$

The difference between each such complex impedance model from the ideal resistor model of Table 1 represents control imperfection that would negatively impact system stability. Different techniques, such as capacitor voltage and inductor current feedforward as well as nonlinear current/voltage control can be applied to improve local control performance, thereby making each terminal more closely resemble the ideal control characteristics represented by the resistor models in Table 1.

A further aspect of the present invention employs the parallel string architecture depicted in FIG. 9a for integrating multiple wind turbine generators into a DC transmission line. In this architecture, each sending terminal is connected to a wind turbine generator and is controlled as a constant-power source. A number of such terminals are connected in series to form a string that is connected to a constant-voltage bus. A number of strings can operate in parallel and feed power to a common constant-voltage bus. The advantage of this parallel string architecture is that a medium or high-voltage DC transmission line can be established by using low-voltage terminal converters to eliminate the need for a separate voltage-boosting converter as required in existing architectures.

A disadvantage of this architecture, however, is that the steady-state voltage across each sending terminal is proportional to its output power. With N sending terminals in series, the voltage across the $k^{th}$ terminal (k=1, 2, ..., N) can be expressed as follows where $V_0$ is the receiving bus voltage, $P_i$ is the output of the $i^{th}$ terminal, and $\overline{P}$ is the average of $P_1, P_2, \ldots, P_N$:

$$V_k = \frac{P_k V_0}{\sum_{i=1}^{N} P_i} = \frac{V_0}{N} \frac{P_k}{\overline{P}}$$

This relationship implies above-average voltages across terminals which send more than the average power. To avoid such over-voltage, the receiving-terminal can be controlled as a constant-current source, as illustrated in FIG. 4 for the four-terminal VSC system. In that case, if the string current is maintained at the rated level, each sending-terminal voltage will remain below the rated voltage as long as the power doesn't exceed the rated level (see FIG. 5). Therefore, by designing each terminal based on a rated voltage equal to the rated power divided by the rated current, over-voltage can be avoided for all terminals.

However, maintaining the receiving-terminal current at its rated level at all time has a disadvantage that the total string voltage drops linearly with the power. This presents two potential problems. First, a terminal may cease to operate when its power drops below a certain level. This is the case for VSC-based terminals, which require the DC terminal voltage be higher than the peak of the ac in-line voltage.

Second, since the conduction loss of conductors and other elements in the current path would remain constant when the current is maintained constant, overall system efficiency could drop significantly at low power level. To avoid these problems, the receiving terminal can switch to current droop control mode when its terminal voltage drops below a certain level. This is illustrated in FIG. 10. Additionally, the sending-terminal control can be modified to incorporate other control methods, described above, to further reduce the voltage variation.

FIG. 9b depicts a series row architecture, wherein multiple source terminals may be connected in parallel first (forming a row), and then in series with other parallel-connected source terminals. Like in the parallel-string architecture in FIG. 9a, each terminal in FIG. 9b may also be controlled as a constant-power source. (A circle with the symbol ⇑ inside represents a constant-power source.) The benefit of this architecture is that the voltage across each row is determined by the average power of the row relative to the average power of other rows connected in series, such that voltage unbalance can be smaller. The receiving terminal control method described above for the parallel string architecture may be applied to this series row architecture as well.

In accordance with the present invention, local direct control of converter-side voltages and currents provides a beneficial way to operate multi-terminal DC power systems. These methods require only local variables that are directly measurable at each terminal. Thus allows each terminal control to be designed and implemented independently from other terminals. In this manner, different terminals can operate autonomously while system stability is ensured by the selection of control methods. Supervisory system coordination, requiring only occasional exchange of low-bandwidth signals, may be incorporated at the system level to avoid possible conflict in steady-state operation and to enhance transient stability. The combination of autonomous local control and simple supervisory system coordination greatly simplifies system design and improves system reliability as well as tolerance to interrupts and faults in communication. The approaches of the present invention can be advantageously applied to multi-terminal HVDC transmission systems, as well as other DC power systems incorporating multiple sources and loads.

What is claimed is:

1. A multi-terminal DC power system, comprising:
a DC network connecting together multiple terminals, each terminal being represented by one of:
a voltage source converter having a parallel capacitor at an interface to the DC network, wherein a difference between a converter-side current and a network-side current charges the capacitor, and
a current source converter having a series inductor at an interface to the DC network, wherein a difference between a converter-side voltage and a network-side voltage drives current through the inductor; and
a local controller for each terminal directly controlling the converter-side current of each voltage source converter and the converter-side voltage of each current source converter, leaving network-side currents and voltages to be determined by the network.

2. The multi-terminal DC power system of claim 1, wherein each terminal comprises a source or a load, and voltage source converters and current source converters of the system support bidirectional power flow.

3. The multi-terminal DC power system of claim 1, wherein, regardless of network topology, the local controller controls converter-side current of a voltage source converter in one or a combination of the following modes:
constant power in which the converter-side current is controlled such that the product between the converter-side current and the terminal voltage follows a given power reference;
constant current in which the converter-side current is controlled to follow a current reference which is independent of terminal voltage;
current droop in which the converter-side current is controlled to follow variation in the terminal voltage by a droop characteristic; and
constant voltage in which the converter-side current is controlled to keep the terminal voltage constant, and wherein the terminal voltage comprises voltage across the capacitor at a DC connection of the voltage source converter to the network.

4. The multi-terminal DC power system of claim 1, wherein, regardless of network topology, the local controller controls the converter-side voltage of a current source converter in one or a combination of the following modes:
constant power in which the product between the converter-side voltage and the terminal current follows a given power reference;
constant voltage in which the converter-side voltage is controlled to follow a voltage reference which is independent of terminal current;
voltage droop in which the converter-side voltage is controlled to follow the terminal current by a droop characteristic; and
constant current in which the converter-side voltage is controlled to keep the terminal current constant and wherein the terminal current comprises current flowing through the inductor at a DC connection of the current source converter to the network.

5. The multi-terminal DC power system of claim 1, wherein the network comprises series or parallel or a mix of series and parallel connections.

6. The multi-terminal DC power system of claim 1, wherein the system comprises a hybrid system including at least one voltage source converter and at least one current source converter.

7. The multi-terminal DC power system of claim 1, further comprising a supervisory system coordinator coordinating a reference used in different local controllers to avoid possible system conflict.

8. The multi-terminal DC power system of claim 7, wherein the reference comprises at least one of: a power reference used in a constant power control mode, a voltage reference used in a constant voltage control mode, a current reference used in a constant current control mode, and a droop characteristic used in a droop control mode.

9. The multi-terminal DC power system of claim 7, wherein the supervisory system coordinator facilitates intermittent exchange of low-bandwidth signals to avoid possible system conflict in steady-state operation and to enhance transient stability.

10. The multi-terminal DC power system of claim 1, having a parallel string architecture, wherein multiple source terminals are connected in series to the DC network forming a string and the series-connected source terminals are connected in parallel with other series-connected source terminals, or having a series row architecture, wherein the multiple source terminals are connected in parallel forming a row first, and then in series with other parallel-connected source terminals to form a string, each sending terminal of the system being controlled as a constant power source, each string being connected to a DC bus, and a receiving terminal being controlled in one or a combination of the following modes to minimize voltage unbalance among the terminals: constant current, constant voltage, and voltage or current droop.

11. A method of operating a multi-terminal DC power system, the system including a DC network connecting together multiple terminals, each terminal being represented by one of: (a) a voltage source converter having a parallel capacitor at the interface to the DC network, wherein a difference between a converter-side current and network-side current charges the capacitor, and (b) a current source converter having a series inductor at the interface to the DC network, wherein a difference between a converter-side voltage and a network-side voltage drives current through the inductor, the method comprising:
directly controlling locally the converter-side current of each voltage source converter and the converter-side voltage of each current source converter at each terminal, and
determining network-side currents and voltages for the terminals by the network.

12. The method of claim 11, wherein, regardless of network topology, the converter-side current of a voltage source converter is controlled in one or a combination of the following modes:
constant power in which the product between the converter-side current and the terminal voltage follows a given power reference;
constant current in which the converter-side current is controlled to follow a current reference which is independent of terminal voltage;
current droop in which the converter-side current is controlled to follow variation in the terminal voltage by a droop characteristic; and
constant voltage in which the converter-side current is controlled to keep the terminal voltage constant, and wherein the terminal voltage comprises voltage across the capacitor at a DC connection of the voltage source converter to the network.

13. The method of claim 11, wherein, regardless of network topology, the converter-side voltage of a current source converter is controlled in one or a combination of the following modes:

constant power in which the products between the converter-side voltage and the terminal current follows a given power reference;
constant voltage in which the converter-side voltage is controlled to follow a voltage reference which is independent of terminal current;
voltage droop in which the converter-side voltage is controlled to follow the terminal current by a droop characteristic; and
constant current in which the converter-side voltage is controlled to keep the terminal current constant, and wherein the terminal current comprises current flowing through the inductor at a DC connection of the current source converter to the network.

14. The method of claim 11, further comprising employing a supervisory system coordinator for intermittent exchange of low-bandwidth signals to avoid possible system conflict in steady-state operation and to enhance transient stability.

15. The method of claim 11, further comprising employing the network in a high-voltage DC transmission application.

16. The method of claim 15, wherein the high-voltage DC transmission application comprises grid integration of renewable energy sources.

17. The method of claim 16, wherein the renewable energy sources comprise an offshore wind farm.

18. The method of claim 11, further comprising applying capacitor voltage or inductor current feedforward or nonlinear current/voltage control to enhance local control performance.

19. The method of claim 12, further comprising limiting rate of change of the power reference or the current reference to avoid transient over-voltage and large current variation during transients.

20. The method of claim 13, further comprising limiting rate of change of the power reference or the voltage reference to avoid transient over-voltage and large current variation during transients.

21. The method of claim 11, wherein the multi-terminal DC power system has a parallel string architecture with a number of sending terminals connected in series to form a string and a number of strings operating in parallel, or has a series row architecture, wherein the multiple source terminals are connected in parallel forming a row and a number a rows are connected in series to form a string, and each string feeds power to a common DC bus, further comprising: controlling a receiving terminal of the network in a constant current mode, with a current reference at or close to a rated current of the receiving terminal, and switching to a current droop control mode when the terminal voltage of the receiving terminal drops below a certain level.

* * * * *